United States Patent
Mornet

(10) Patent No.: US 10,240,770 B2
(45) Date of Patent: Mar. 26, 2019

(54) LIGHTING MODULE COMPRISING A LASER ELEMENT

(71) Applicant: VALEO VISION, Bobigny (FR)

(72) Inventor: Eric Mornet, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/586,735

(22) Filed: May 4, 2017

(65) Prior Publication Data

US 2017/0321862 A1    Nov. 9, 2017

(30) Foreign Application Priority Data

Apr. 5, 2016  (FR) ...................................... 16 54049

(51) Int. Cl.
| | |
|---|---|
| *F21S 41/16* | (2018.01) |
| *F21V 25/04* | (2006.01) |
| *F21V 23/04* | (2006.01) |
| *B60Q 1/00* | (2006.01) |
| *F21S 41/14* | (2018.01) |
| *F21S 41/33* | (2018.01) |

(Continued)

(52) U.S. Cl.
CPC ............ *F21V 25/04* (2013.01); *B60Q 1/0023* (2013.01); *F21S 41/14* (2018.01); *F21S 41/16* (2018.01); *F21S 41/338* (2018.01); *F21S 43/13* (2018.01); *F21S 43/30* (2018.01); *F21V 23/0457* (2013.01); *F21Y 2115/30* (2016.08)

(58) Field of Classification Search
CPC ............................... B60Q 1/0023; F21S 41/16
See application file for complete search history.

(56) References Cited

U.S. PATENT DOCUMENTS

| | | | |
|---|---|---|---|
| 2014/0268846 A1* | 9/2014 | Nakazato | F21S 48/1145 362/510 |
| 2016/0003707 A1* | 1/2016 | Ahn | G01J 3/505 356/402 |

(Continued)

FOREIGN PATENT DOCUMENTS

| | | |
|---|---|---|
| DE | 10 2014 205 606 A1 | 10/2015 |
| DE | 10 2014 214 601 A1 | 1/2016 |

(Continued)

OTHER PUBLICATIONS

French Preliminary Search Report dated Aug. 26, 2016 in French Application 16 54049 filed on May 4, 2016 (with English Translation of Categories of Cited Documents).

*Primary Examiner* — Mariceli Santiago

(74) *Attorney, Agent, or Firm* — Oblon, McClelland, Maier & Neustadt, L.L.P.

(57) ABSTRACT

A lighting module includes a semiconductor laser element configured for emitting a laser beam in an emission cone, a light-emitting element, and a reflecting surface, a main portion of which reflects light coming from the light-emitting element in order to form an outgoing light beam. A secondary guiding face reflects the light coming from the first emission cone into a measurement cone. Also included is a device for detecting incident light exceeding a predetermined threshold of light intensity which is arranged within the measurement cone. The optical structure of the guiding face causes a spreading of the light so that the measurement cone exhibits an aperture angle greater than that of the first emission cone.

14 Claims, 3 Drawing Sheets

(51) Int. Cl.
  *F21S 43/13*    (2018.01)
  *F21S 43/30*    (2018.01)
  *F21Y 115/30*   (2016.01)

(56) References Cited

U.S. PATENT DOCUMENTS

2016/0290584 A1* 10/2016 Nomura ................... H01S 5/005
2016/0305626 A1* 10/2016 Tatara ................. F21S 48/1225
2017/0102118 A1*  4/2017 Nauen ..................... F21S 41/24
2017/0324214 A1* 11/2017 Renaud ............... B60Q 1/0408

FOREIGN PATENT DOCUMENTS

DE    102015224438 A1 *  6/2017  .............. F21S 41/00
JP       2014180886 A  *  9/2014  ........... B60Q 1/0023

* cited by examiner

LIGHTING MODULE COMPRISING A LASER ELEMENT

TECHNICAL FIELD OF THE INVENTION

The invention relates to a lighting module designed to emit a light beam comprising a semiconductor laser element.

The invention more particularly relates to a lighting module, notably for an automobile vehicle, designed to emit an outgoing light beam and comprising:
- at least one semiconductor laser element configured for emitting a laser beam in a first light cone, called emission cone;
- a light-emitting element configured for converting the wavelength of at least a part of said laser beam;
- a reflecting surface, a main portion of which reflects light coming from the light-emitting element so as to form said outgoing light beam oriented in a first direction of emission,
- a secondary guiding face which reflects the light coming from the first emission cone into a second light cone, called measurement cone, oriented in a second measurement direction;
- at least one device for detecting incident light exceeding a predetermined threshold of light intensity which is arranged within the measurement cone.

TECHNICAL BACKGROUND OF THE INVENTION

Semiconductor laser elements offer very advantageous properties, for example a very reduced light emission surface area, together with a very intense and very collimated laser beam. The optical systems for laser light may therefore be designed with focal distances much shorter than for systems using less collimated light sources, for example incandescent lamps and light-emitting diodes (LEDs). Optical systems for laser light thus have particularly reduced space requirement.

However, the use of a semiconductor laser element as a light source for the lighting modules of automobile vehicles poses certain problems due, notably, to the fact that such a light source emits a substantially monochromatic coherent beam of light. Thus, the type of laser used for lighting or signaling applications onboard an automobile vehicle emits a laser beam which is likely to pose certain safety problems if the laser beam is directly projected onto the road. Such a laser beam could notably be harmful for the eyes of an observer.

Furthermore, the lighting or signaling functions of automobile vehicles require light beams having light with a wider spectrum than that of a laser beam, for example a white light.

In order to solve the safety problems while at the same time transforming the laser beam into light radiation adapted for the lighting or signaling functions, a known solution is to interpose a light-emitting element in the path of the laser beam. Such a light-emitting element comprises, for example, a light-emitting substance which is excited by light whose wavelength corresponds to that of the laser beam, for example blue. As a result, the light-emitting element emits a light whose radiation spectrum extends over a range centered in the yellow and extending from green to red. Thus, at least a part of the incident light of a given wavelength is converted into light which has a wider spectrum of wavelengths and is centered around a wavelength complementary to the initial wavelength and which is emitted in all directions.

In addition, at least another part of the incident light is dispersed by the light-emitting element. In this way, the dispersed light and the converted light are superposed in an additive manner, for example so as to form a white light.

For the aforementioned safety reasons, the light-emitting element is of particular importance. If the light-emitting element were to be damaged or removed from the path of the laser beam, for example following an impact, the concentrated and unconverted laser beam risks being emitted by the lighting module in the direction initially provided for the outgoing light beam. In these cases, safety measures must be envisioned in order to avoid putting the users of the road in danger.

One solution envisioned is to place a device for detection of the wavelength of the laser in the path of the laser beam downstream of the light-emitting element. Thus, when the light-emitting element no longer fulfills its role, the laser beam falls directly onto the detection device. If this is the case, the power supply of the laser element is interrupted by a means for driving the laser element, for example an electronic control unit.

However, such devices require a precise arrangement of the detection device. This notably requires a very small positioning tolerance of the means for guiding the light with respect to the optical means.

Moreover, when it is directly impacted by the laser beam, the detection device is rapidly saturated. It is not therefore very easy to adjust the saturation while at the same time obtaining a detection sensitivity sufficient for the aforementioned safety use.

BRIEF SUMMARY OF THE INVENTION

The present invention provides a lighting module of the type previously described, characterized in that the optical structure of the guiding face causes a spreading of the light so that the measurement cone has an aperture angle greater than that of the first emission cone.

The secondary guiding face is arranged so that the second measurement direction is different from the first direction of emission, notably in such a manner that the light reflected by the guiding face does not participate in the formation of the outgoing light beam.

According to other features of the invention:
- the geometrical profile of the envelope of the guiding face causes a spreading the light in the measurement cone;
- the guiding face comprises striations which cause the spreading of the light;
- the guiding face comprises a series of adjacent reflecting facets which cause the spreading of the light;
- the guiding face comprises a series of adjacent pillows which cause the spreading of the light;
- the surface state of the guiding face causes a scattering of the light in the measurement cone;
- the lighting module comprises at least two detection devices which are each arranged within the measurement cone;
- the lighting module comprises a means for driving the laser element which is designed to interrupt the emission of the laser beam when the detection device detects an intensity greater than the predetermined threshold;

the guiding face is formed by a secondary portion of the reflecting surface.

BRIEF DESCRIPTION OF THE FIGURES

Other features and advantages of the invention will become apparent upon reading the detailed description that follows for the understanding of which reference can be made to the appended drawings, in which.

DETAILED DESCRIPTION OF THE FIGURES

In the following part of the description, elements having an identical structure or analogous functions will be denoted by the same references.

In the description and the claims, the term "light cone" is applicable to the envelope of a light beam. Such a light cone is not only limited to cones of revolution. Thus, it will be understood that a light cone may have cross-sections of various shapes, for example round, ovoid, rectangular, etc.

Figure 1:
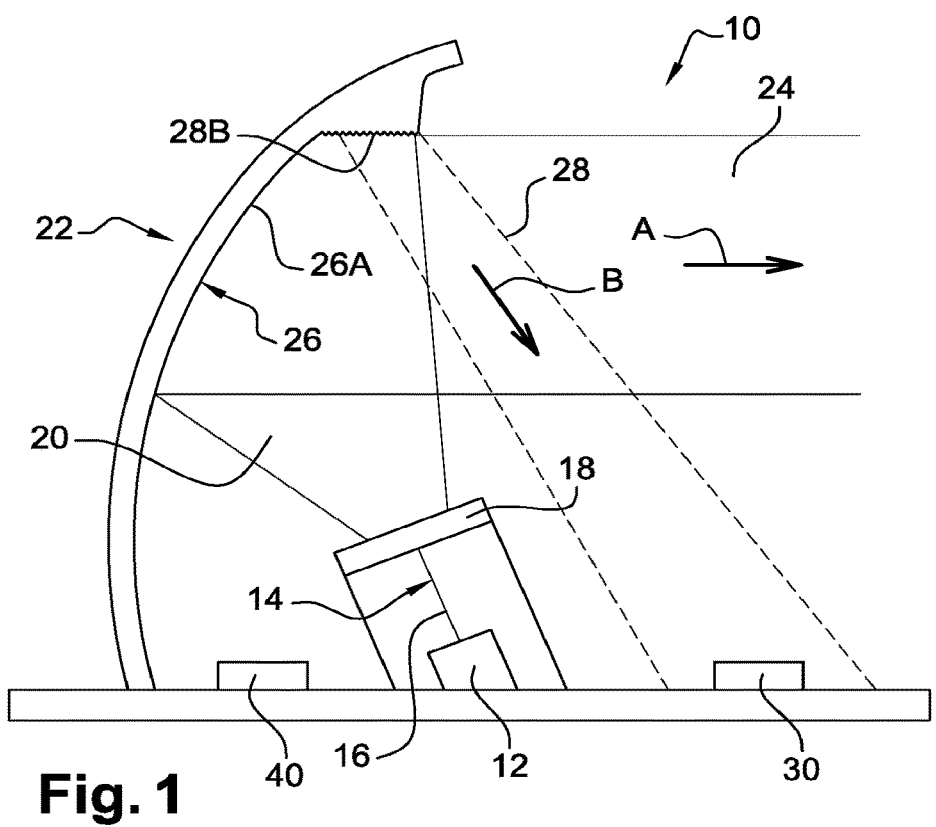
FIG. 1 is a schematic view in axial cross-section which shows a lighting module with a laser element fabricated according to the teachings of the invention, the lighting module emitting an outgoing light beam.

FIG. 1 shows a lighting module 10 comprising a semiconductor laser element 12. The laser element 12 is configured for emitting a laser beam 14 whose envelope is bounded by a first light cone 16, referred to as emission cone 16, with a very tight aperture angle around an overall direction of emission. For example, the cone has a cross-section of elliptical shape whose aperture varies between 8° and 40°. In this respect, in the drawings, the laser beam 14, which is for example a laser beam 14 of blue color, will be represented by a simple line.

When the lighting module 10 operates normally, as is illustrated in FIG. 1, the laser beam 14 is intercepted by a light-emitting element 18 which is arranged in the path of the laser beam 14. The light-emitting element 18 is configured for converting the wavelength of at least a part of said laser beam 14 into a non-coherent light with a wavelength different from that of the laser beam 14.

Furthermore, the light-emitting element 18 is designed to disperse the light passing through it.

This element could for example be an optical element comprising a luminophore.

Under the effect of the laser beam 14, the light-emitting element 18 emits light distributed within a secondary light beam 20 with an aperture angle that is very large compared to that of the laser beam 14. The light emitted in the secondary light beam 20 is polychromatic, or white, and non-coherent. Its light intensity is reduced with respect to that of the laser beam 14. This light thus no longer represents a danger for the users of the road.

The lighting module 10 also comprises an optical means for transforming the light coming from the light-emitting element 18 into an outgoing light beam 24 oriented in a first direction "A" of emission. This outgoing light beam 24 is oriented toward the outside of the vehicle, for example forward, in order to provide a lighting or signaling function.

The optical means is formed by a reflector 22 which has a reflecting surface 26, a main portion 26A of which is designed to transform, by reflection, the secondary beam 20 into an outgoing beam 24 collimated in the direction "A" of emission.

The main portion 26A thus forms a collimated portion which here has a substantially parabolic shape. For this purpose, the light-emitting element 18 is arranged substantially at a focal point of the main portion 26A of the reflecting surface 26.

When the light-emitting element 18 is no longer capable of fulfilling its function, the laser beam 14, passing close to the focal point of the main portion 26A of the reflecting surface 26, risks being reflected by the latter in the direction "A" of emission.

In order to avoid such a situation, a guiding reflecting face is interposed in the path of the first emission cone 16. The guiding face is arranged for reflecting at least a part of the light emitted in said emission cone 16 for forming a measurement light beam which is bounded by a second light cone 28 oriented toward a second given measurement direction "B", henceforth referred to as "measurement cone 28".

The guiding face is arranged so that the second measurement direction "B" is distinct from the first direction "A" of emission, notably in such a manner that the light reflected by the guiding face does not participate in the formation of the outgoing light beam 24.

The guiding face is carried in a fixed manner by the reflector. The guiding face is formed by a secondary portion 26B of the reflecting surface 26 which reflects the light coming from the emission cone 16 into the measurement cone 28. The secondary portion 26B of reflecting surface is thus formed as a single member with the main portion 26A of reflecting surface.

Advantageously, the secondary portion 26B is arranged at one end downstream of the reflecting surface 26 in the direction of projection of the outgoing light beam 24.

As a variant, the guiding face is formed by a reflection face of an element mounted on the main portion of reflecting surface, for example a prism.

Furthermore, the lighting module 10 is also equipped with at least one device 30 for detecting incident light exceeding a predetermined threshold of light intensity, henceforth referred to as "safety threshold". For this purpose, the detection device 30 has a light-sensitive surface. The detection device 30 is designed to detect an increase in the intensity of the light radiation beyond said safety threshold. This is a safety threshold below which the light radiation presents no danger for the safety of the road users.

As a variant, the detection device is designed to measure, in an absolute manner, the light intensity of the light radiation detected.

The detection device 30 here comprises a photodiode.

The detection device 30 is arranged in such a manner as to detect the light which is reflected into the measurement cone 28. For this purpose, the detection device 30 is arranged within the measurement cone 28. The measurement cone 28 is thus directed toward the sensitive surface of the detection device 30.

The lighting module 10 furthermore comprises a driving means 40, for example an electronic control unit, which is able to command the disabling of the laser element 12, for example by switching off the electrical power supply to the laser element 12.

The monitoring of the light intensity of the light rays included within the measurement cone 28 allows it to be verified that the light-emitting element 18 is correctly fulfilling its role.

When the lighting module 10 operates normally, as illustrated in FIG. 1, the light coming from the laser beam 14 has been converted and dispersed by the light-emitting element 18 prior to being emitted toward the reflecting surface 26 in order to form the outgoing light beam 24. The secondary portion 26B samples a part of the light rays, which thus exhibit the same properties as the light rays forming the outgoing light beam 24. These light rays are reflected into the measurement cone 28 in the measurement direction "B" oriented toward the sensitive surface of the detection device 30. Thus, the light incident on the detection device 30 exhibits a moderate light intensity which is lower than the safety threshold, guaranteeing a safe use of the lighting module 10.

In contrast, the driving means 40 is designed to disable the laser element 12 when the light intensity of the light rays contained in the measurement cone 28 exceeds the safety threshold.

Figure 2:
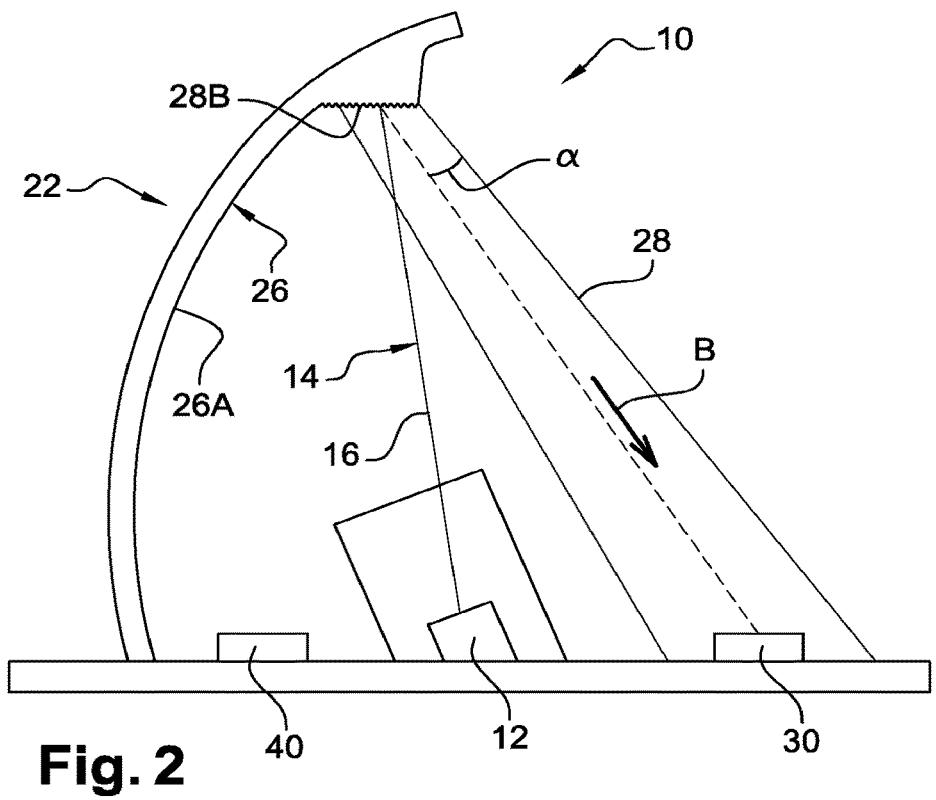
FIG. 2 is a view similar to that of FIG. 1 which shows the lighting module from FIG. 1 in the case of a malfunction, the laser beam being reflected by a guiding face toward a detection device.

FIG. 2 shows the lighting module 10 when the light-emitting element 18 no longer fulfills its function. The light-emitting element 18 has, for example, been dislodged from its accommodation subsequent to an impact. It is thus no longer sitting in the path of the laser beam 14. In the absence of the light-emitting element 18, the laser beam 14, whose light intensity is potentially dangerous, hits directly the secondary portion 26B which is arranged in the emission cone 16.

At least a part of the laser beam 14 is reflected into the measurement cone 28 in the measurement direction "B" oriented directly toward the sensitive surface of the detection device 30. The light rays reaching the sensitive surface of the detection device 30 then have a light intensity which has not been substantially attenuated with respect to the exit of the laser beam 14. Thus, the light intensity of the light rays deviated by the optical element 36 toward the detection device 30 exceed the safety threshold.

The exceeding of the safety threshold is communicated by the detection device 30 to the driving means 40. In response, the driving means 40 disables the laser element 12. In this way, the driving means 40 interrupt the production of the laser beam 14, preventing any harmful light radiation from exiting the lighting module 10.

When the secondary portion 26B comprises a substantially plane and smooth reflecting surface, the measurement cone 28 has an aperture angle identical to that of the emission cone 16. For this reason, the area illuminated by the measurement beam at the support of the detection device is very small. This means that the detection device needs to be positioned in a very precise manner with respect to the reflector 26.

Furthermore, in such a disposition, when the laser beam is directly reflected by the secondary portion 26B of reflecting surface, the light intensity of the measurement beam is extremely high with respect to that of the beam of light correctly converted by the light-emitting element. This results in a high risk of saturation of the detection device. It is therefore necessary to adjust the detection device in such a manner that it does not saturate while at the same time conserving a sufficient detection sensitivity. Such an operation is extremely tricky.

In order to solve these problems, the invention provides for the secondary portion 26B of reflecting surface 26 to comprise means for spreading the light so that the measurement cone 28 has an aperture angle greater than that of the first emission cone 16. Thus, the reflected measurement light beam is very divergent with respect to the laser beam.

The secondary portion 26B of reflecting surface thus comprises means for spreading the outgoing light into the measurement cone 28 by reflection or by diffusion, at least in one plane, with an aperture angle $\alpha$ which is substantially greater than the virtually zero aperture angle of the emission cone 16. The measurement cone 28 thus diverges from the guiding face 26B toward the detection device 30.

This results in the area illuminated at the support of the detection device being larger. Thus, the positioning tolerance of the detection device with respect to the secondary portion 26B of reflecting surface is increased.

Furthermore, when the secondary portion 26B of reflecting surface is directly exposed to the laser beam, the light intensity of the reflected measurement beam is slightly decreased with respect to that of the laser beam emitted in the emission cone 16. This allows the adjustment of the saturation of the detection device to be facilitated.

Figure 3:
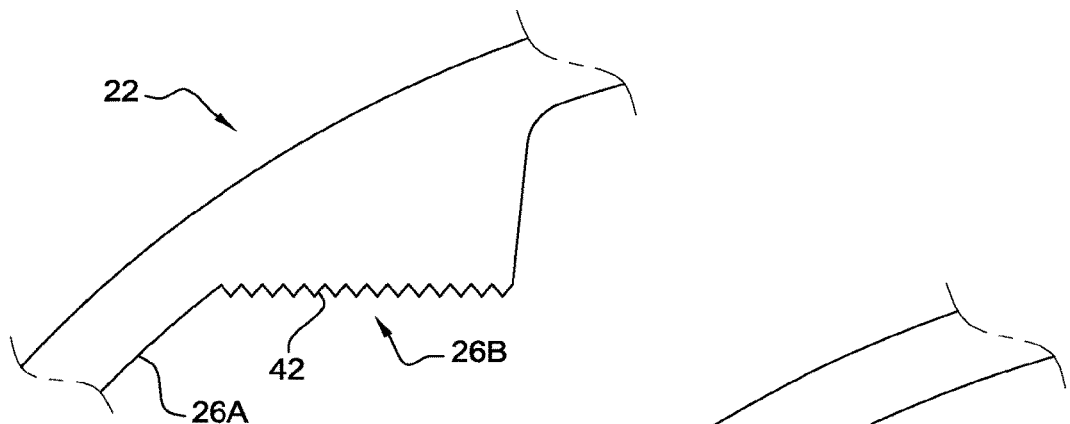
FIG. 3 is a view of a detail at a larger scale which shows the guiding face in FIG. 1, formed according to a first embodiment of the invention in which the guiding face comprises striation.
Figure 4:
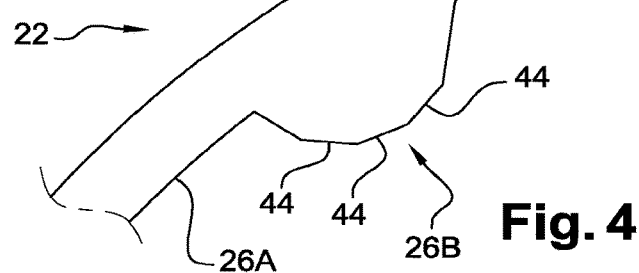
FIG. 4 is a view similar to that of FIG. 3 which shows the guiding face formed according to a second embodiment of the invention in which the guiding face comprises adjacent plane facets.
Figure 5:
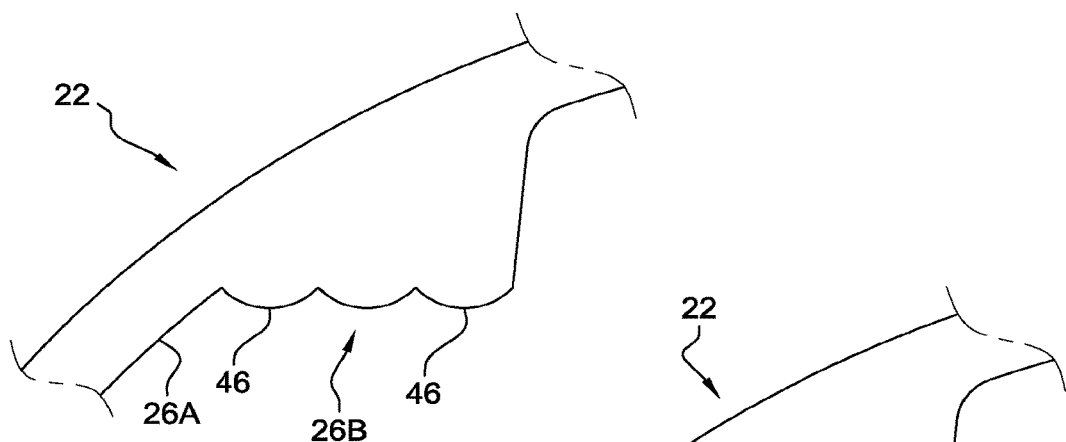
FIG. 5 is a view similar to that of FIG. 3 which shows the guiding face formed according to a third embodiment of the invention in which the guiding face comprises adjacent facets in the shape of pillows.

According to a first embodiment of the invention shown in FIGS. 3 to 5, the geometrical profile of the envelope of the secondary portion 26B of reflecting surface is designed to cause a spreading the light in the measurement cone 28. The secondary portion 26B of reflecting surface is thus structured for distributing the light into the measurement cone 28.

According to a first example of this first embodiment shown in FIG. 3, the secondary portion 26B of reflecting surface comprises striations 42 which cause the spreading of the light in at least a transverse direction.

According to a second example of this first embodiment shown in FIG. 4, the secondary portion 26B of reflecting surface comprises a series of adjacent reflecting facets 44 which cause the spreading of the light. The facets 44 are plane and form angles with one another.

According to a third example of this first embodiment, the secondary portion 26B of reflecting surface comprises a series of adjacent facets in the form of pillows 46 which cause the spreading of the light.

According to a second embodiment of the invention, the surface state of the secondary portion 26B of reflecting surface causes a diffusion of the light into the measurement cone 28.

Figure 6:
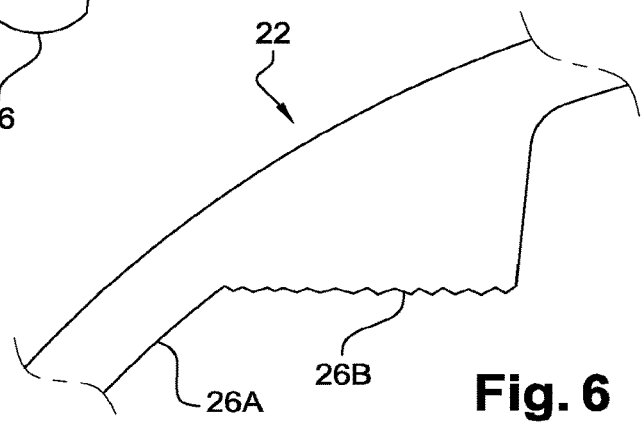
FIG. 6 is a view similar to that of FIG. 3 which shows the guiding face formed according to a fourth embodiment of the invention in which the guiding face is grained.

Thus, as shown in FIG. 6, the secondary portion 26B of reflecting surface is for example grained in order to diffuse the light into the second measurement cone 28.

As shown in FIG. 2, the detection device 30 may be arranged on the main axis of the measurement cone 28, or slightly off-axis, while remaining inside of the measurement cone 28.

The invention advantageously allows the light incident on the entirety of the sensitive surface of the detection device 30 to be uniformly distributed. This allows the adjustment of the saturation of the detection device 30 to be greatly simplified.

Figure 7:
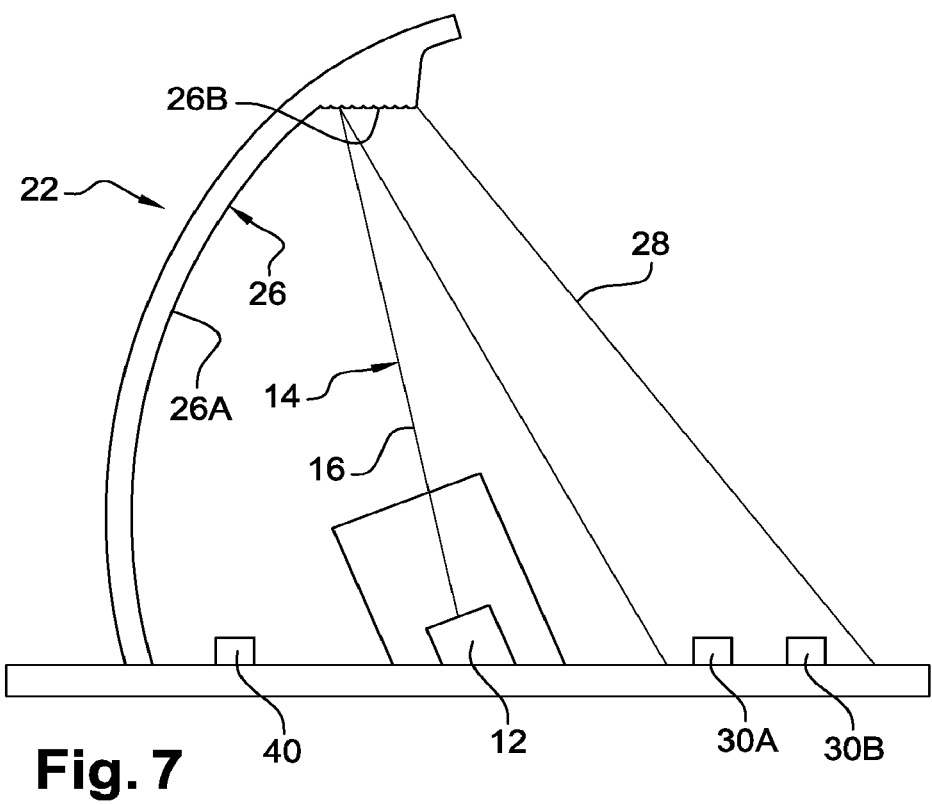
FIG. 7 is a view similar to that of FIG. 2 which shows a variant embodiment of the invention in which the lighting module comprises two detection devices.

One variant embodiment of the invention has been shown in FIG. 7. The lighting module 10 here comprises several devices for detecting the light intensity. All the detection devices are arranged within the measurement cone 28.

In the example shown in the FIG. 7, it comprises two detection devices 30A, 30B. Each detection device 30A, 30B is able to communicate with the driving means 40 in order to allow the laser element 12 to be disabled when the light is detected to exceed the safety threshold by one and/or the other of the detection devices 30A, 30B.

Each of these detection devices 30A, 30B is arranged within the measurement cone 28. The two devices 30A, 30B are arranged here in an off-axis manner with respect to the main axis of the measurement cone 28.

The presence of the two detection devices 30A, 30B allows the intensity of the light rays of the measurement cone 28 to be detected in a redundant manner. It is thus possible to diagnose the malfunctioning of one of the detection devices 30A, 30B when the detection devices 30A, 30B communicate contradictory information to the driving means 40.

The lighting module 10 fabricated according to the teachings of the invention thus allows freedom to be given in the positioning tolerance of the detection device 30 with respect to the secondary portion 26B. Indeed, the spreading of the light into a more open light cone allows a larger illuminated surface to be made available within which the detection device 30 may be arranged.

Moreover, the possibility of obtaining a measurement beam having a larger aperture angle allows the entirety of the sensitive surface of the detection device 30 to be illuminated, thus facilitating the adjustment of its saturation.

Furthermore, when the aperture angle is designed to be sufficiently wide, it is possible to arrange two detection devices 30 within the same measurement beam. Accordingly, the lighting module 10 operates in a much safer manner.

The invention claimed is:

1. A lighting module for an automobile vehicle and designed to emit an outgoing light beam, the lighting module comprising:
    at least one semiconductor laser element configured for emitting a laser beam in a first light cone, referred to as emission cone;
    a light-emitting element configured for converting a wavelength of at least a part of said laser beam;
    a reflecting surface, a main portion of which reflects light coming from the light-emitting element in order to form said outgoing light beam oriented in a first direction of emission,
    a secondary guiding face which reflects the light coming from the emission cone into a second light cone, referred to as measurement cone, oriented in a second measurement direction;
    at least one device for detecting incident light exceeding a predetermined threshold of light intensity which is arranged within the measurement cone;
    wherein a geometrical profile of an envelope of the guiding face causes a spreading of the light so that the measurement cone exhibits an aperture angle greater than that of the emission cone, and
    wherein the light reflected by the guiding face does not form a part of the outgoing light beam.

2. The lighting module according to claim L wherein the guiding face comprises striations which cause the spreading of the light.

3. The lighting module according to claim 1, wherein the guiding face comprises a series of adjacent reflecting facets which cause the spreading of the light.

4. The lighting module according to claim 1, wherein the guiding face comprises a series of adjacent pillows which cause the spreading of the light.

5. The lighting module according to claim 1, wherein the lighting module comprises at least two detection devices which are each arranged within the measurement cone.

6. The lighting module according to claim 1, wherein the lighting module comprises a means for driving the laser element which is designed to interrupt the emission of the laser beam when the detection device detects an intensity higher than the predetermined threshold.

7. The lighting module according to claim 6, wherein the guiding face is formed by a secondary portion of the reflecting surface.

8. The lighting module according to claim 2, wherein the lighting module comprises a means for driving the laser element which is designed to interrupt the emission of the laser beam when the detection device detects an intensity higher than the predetermined threshold.

9. The lighting module according to claim 3, wherein the lighting module comprises a means for driving the laser element which is designed to interrupt the emission of the laser beam when the detection device detects an intensity higher than the predetermined threshold.

10. The lighting module according to claim 4, wherein the lighting module comprises a means for driving the laser element which is designed to interrupt the emission of the laser beam when the detection device detects an intensity higher than the predetermined threshold.

11. The lighting module according to claim 5, wherein the lighting module comprises a means for driving the laser element which is designed to interrupt the emission of the laser beam when the detection device detects an intensity higher than the predetermined threshold.

12. The lighting module according to claim 2, wherein the guiding face is formed by a secondary portion of the reflecting surface.

13. The lighting module according to claim 3, wherein the guiding face is formed by a secondary portion of the reflecting surface.

14. The lighting module according to claim 4, wherein the guiding face is formed by a secondary portion of the reflecting surface.

* * * * *